(12) United States Patent
Koumura et al.

(10) Patent No.: US 7,116,022 B2
(45) Date of Patent: Oct. 3, 2006

(54) AC GENERATOR FOR VEHICLE

(75) Inventors: Masatoshi Koumura, Okazaki (JP); Kouichi Ihata, Okazaki (JP); Akihito Koike, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/081,646

(22) Filed: Mar. 17, 2005

(65) Prior Publication Data

US 2005/0212368 A1   Sep. 29, 2005

(30) Foreign Application Priority Data

Mar. 29, 2004   (JP) ............................. 2004-094918

(51) Int. Cl.
*H02K 7/00*   (2006.01)
(52) U.S. Cl. ..................... 310/68 D; 310/64
(58) Field of Classification Search ............. 310/68 D, 310/89, 58, 59, 60 R, 60 A, 61–64
See application file for complete search history.

(56) References Cited

U.S. PATENT DOCUMENTS

| 4,419,597 | A | * | 12/1983 | Shiga et al. ............. 310/68 D |
| 5,095,235 | A | * | 3/1992 | Kitamura .................. 310/68 D |
| 5,729,063 | A | * | 3/1998 | Adachi et al. ............ 310/68 D |
| 5,949,166 | A |   | 9/1999 | Ooiwa et al. ............. 370/68 D |
| 6,184,602 | B1 |   | 2/2001 | Ooiwa et al. ............. 310/68 D |
| 6,198,188 | B1 |   | 3/2001 | Ihata |
| 6,577,032 | B1 | * | 6/2003 | Irie .......................... 310/68 D |
| 2002/0050502 | A1 |   | 5/2002 | Jeong |

FOREIGN PATENT DOCUMENTS

| EP | 1 394 925 A2 | 3/2004 |
| JP | A-2001-037142 | 2/2001 |

* cited by examiner

*Primary Examiner*—Dang Le
(74) *Attorney, Agent, or Firm*—Oliff & Berridge PLC (57) ABSTRACT

An AC generator has negative pole-side rectifier devices press-fitted to a holder fin so as to dispose a bottom face of the rectifier device on a surface of the holder fin. The holder fin is disposed in such a manner that the bottom face of the rectifier device faces a rear frame of the AC generator. A clearance is formed between the rear frame and the bottom face through which the cooling wind for the rectifier device flows. The rear frame is provided with a slant face on its outer wall face for inducing the cooling wind introduced through an opening of the protection cover of the AC generator to the rectifier devices. Thus, the cooling wind induced by the slant face can hit on the bottom face of the rectifier devices directly, so as to cool the rectifier device well.

2 Claims, 6 Drawing Sheets

AC GENERATOR FOR VEHICLE

CROSS REFERENCE TO RELATED APPLICATIONS

This application is based upon and claims the benefit of priority of Japanese Patent Application No. 2004-94918 filed on Mar. 29, 2004, the contents of which are incorporated herein by reference.

FIELD OF THE INVENTION

The present invention relates to an AC generator for vehicles, especially relates to an AC generator targeting on an improvement of cooling performance for a rectifier located therein.

BACKGROUND OF THE INVENTION

Currently, a large power output is demanded for AC generator for vehicle, making a key issue in improving a cooling ability for a rectifier located therein, which generates a large amount of heat by a large current flowing therethrough. It is considered to raise an ability of fans for cooling the rectifier, however, this increases a noise of the fans. Thus, to secure a vehicular compartment against noise, it is not always appropriate to raise the cooling ability of the fans.

JP-2001-037142-A and U.S. Pat. Nos. 6,184,602 and No. 5,949,166 (JP Patent No. 3438577) disclose AC generators having an opening for inducing outer air to flow through an air passage between a rear frame and a protection cover as a cooling wind and to hit on a holder fin, which locates a rectifier thereon, so as to cool the rectifier.

However, according to the above public knowledge, the air passage is formed at rear side of the holder fin, so that the rectifier is not directly disposed to the cooling wind and not sufficiently cooled. Further, a clearance forming the air passage between the rear frame and the holder fin is narrow, so that muddy water, which may cause an erosion, stays therein.

SUMMARY OF THE INVENTION

The present invention is achieved in view of the above issues, and its object is to provide an AC generator for a vehicle that has a high cooling ability for the rectifier device without raising an ability of a cooling fan and that can efficiently discharge muddy water intruded inside of a protection cover.

To achieve the above object, an AC generator for a vehicle of the present invention has a rotor, a frame having a slant face, a cooling fan, a protection cover and a rectifier.

The rotor is rotated by a torque generated by an engine for example and transmitted thereto. The frame rotatably supports the rotor. The cooling fan is fixed to the rotor and for taking in a cooling wind from outside by rotating integrally with the rotor. The protection cover is disposed outside of the frame so that the frame and the protection cover form a gap therebetween for taking in the cooling wind.

The rectifier is disposed between the frame and the protection cover and having a first end face and a second end face. The first end face faces the frame, and the second end face is opposite to the frame. The slant face of the frame faces the rectifier. A distance between the slant face and the first end face of the rectifier increases toward outer side in a radial direction of the frame.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

First Embodiment

Figure 1:
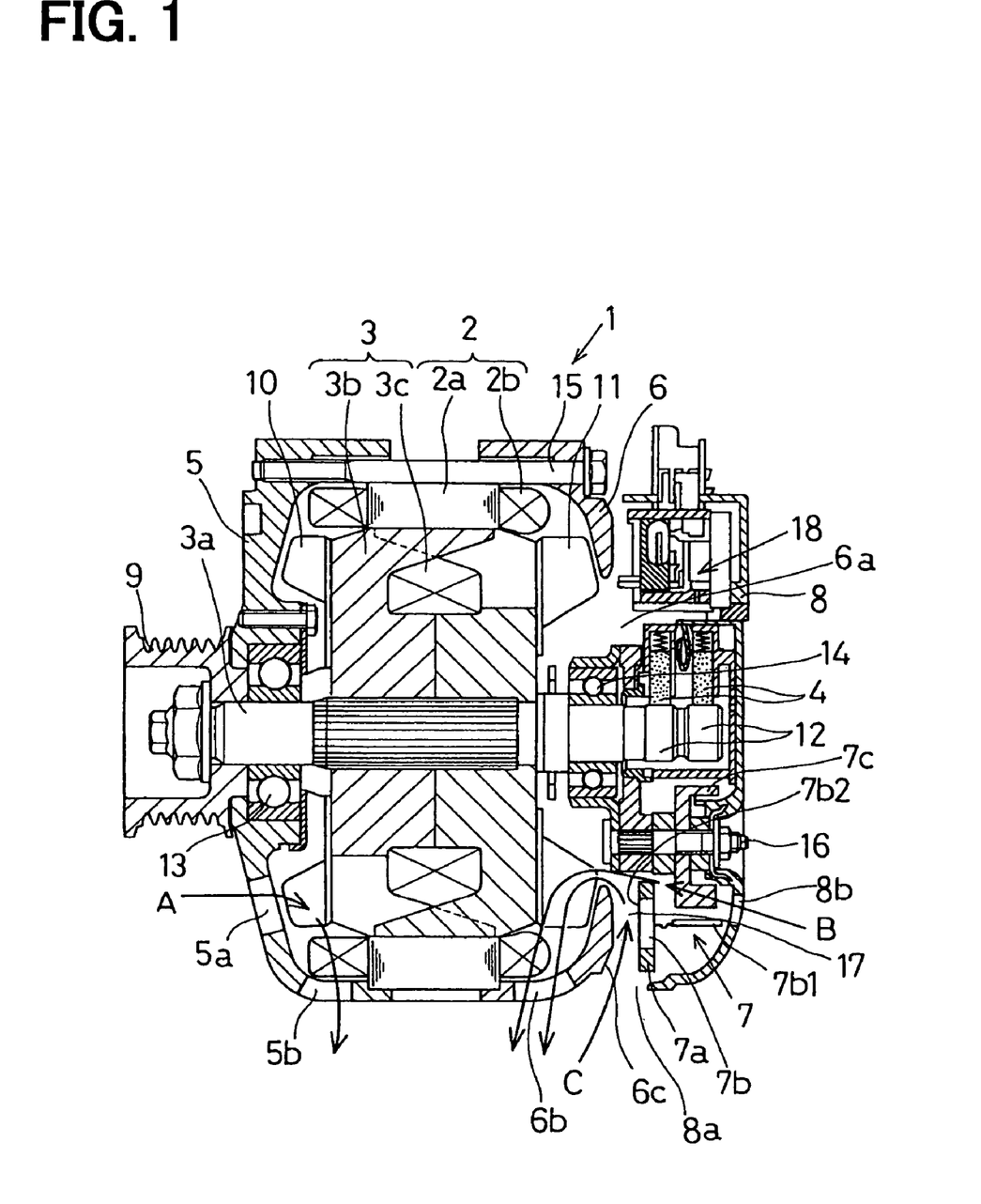
FIG. 1 is a cross-sectional view of an AC generator for a vehicle according to a first embodiment of the present invention.

As shown in FIG. 1, an AC generator 1 for vehicle according to a first embodiment has a stator 2, a rotor 3, a brush 4, frames 5, 6, a rectifier 7 and a protection cover 8, which will be described below.

The stator 2 has a stator core 2a supported by the frames 5, 6, and an armature winding 2b winded on the stator 2. A rotation of the rotor 3 induces AC voltage in the armature winding 2b. For instance, the armature winding 2b has three armature coils, which are connected by a Y connection or by a delta connection.

The rotor 3 has a rotor shaft 3a to which a pulley 9 transmits a torque generated by an engine (not shown), a pair of pole cores (magnetic poles) 3b fixed onto the rotor shaft 3a and a field winding 3c wound on the pole cores 3b. The pulley 9 is fixed on one end portion of the rotor shaft 3a, and connected to a crank pulley (not shown) of the engine via a belt (not shown).

Cooling fans 10, 11 are respectively fixed to both axial end faces of the pole core 3b and taking in cooling wind (outer air) from outside of the frames 5, 6 by integrally rotating with the rotor 3.

Brushes 4 are in slide contact with slip rings 12 provided at the other end side of the rotor shaft 3a, and supply an exciting current to the field winding 3c.

Frames 5, 6 are composed of a front frame 5, which supports one end side of the rotor shaft 3a by a bearing 13, and a rear frame. 6, which supports the other end side of the rotor shaft 3a by a bearing 14. The frames 5, 6 support the stator core 2a interposed therebetween, and are fastened by bolts 15 to each other. The front frame 5 has air intake windows 5a for taking in the cooling wind and air discharge windows 5b for discharging the cooling wind. Similarly, the front frame 6 has air intake windows 6a for taking in the cooling wind and air discharge windows 6b for discharging the cooling wind.

The rectifier 7 is for converting an AC voltage induced in the armature winding 2b into DC voltage by a full wave rectification. The rectifier 7 is composed of a negative pole-side rectifier devices (diodes) 7b fixed to a holder fin 7a at a negative potential, and a positive pole-side rectifier devices (not shown) fixed to a holder fin 7c at a positive potential. As shown in FIG. 1, the rectifier 7 is disposed at an axially outer side of the rear frame 6 and fixed to the rear frame 6 by tightening a bolt 16.

Here, the negative pole-side rectifier devices 7b are press-fitted to the holder fin 7a made of aluminum, etc. The rectifier devices 7b have leads 7b1 connected to the armature winding 2b on one end faces thereof. The other end faces (the bottom faces) 7b2 of the rectifier devices 7b opposite to the leads 7b1 are exposed on a surface of the holder fin 7a.

The holder fin 7a is disposed in such a manner that the bottom faces 7b2 of the rectifier devices 7b face an outer face of the rear frame 6. A clearance is formed between the outer face of the rear frame 6 and the holder fin 7a for flowing the cooling wind.

The protection cover 8 is made from a molded resin, etc. The protection cover 8 covers the above rectifier 7, brushes 4, a voltage adjuster 18, which is for adjusting an output voltage of the AC generator 1 to a predetermined voltage, and so on, and is fixed to the rear frame 6 together with the holder fin 7a by the bolt 16.

Openings 8a are formed at radially peripheral portion of the protection cover 8, for introducing the cooling wind into a space between the rear frame 6 and itself. Further, aeration windows 8b are formed on an axially outer wall of the protection cover 8 for introducing the cooling wind.

Figure 2:
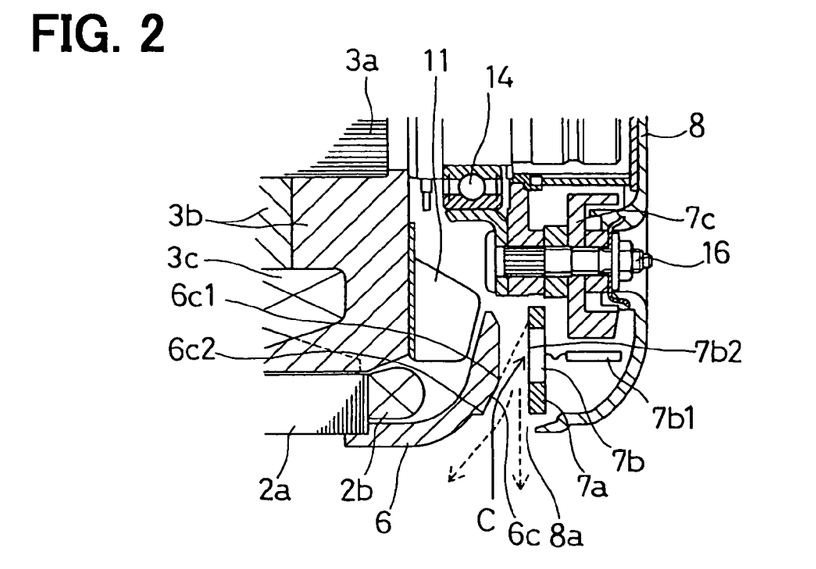
FIG. 2 is a cross-sectional view of a rectifier and its surrounding area according to the first embodiment.

The rear frame 6 has a slant face 6c on its radially peripheral portion facing the rectifier 7, so as to introduce the cooling wind entering through the openings 8a to the negative pole-side rectifier devices 7b. As shown in FIG. 2 for example, the slant face 6c is disposed in such a manner that the distance 17 between the slant face 6c and the holder fin 7a gradually increases from a start end 6c1, which is a radially inner end of the slant face 6c, to a terminal end 6c2, which is a radially outer end of the slant face 6c.

The angle of gradient of the slant face 6c is set so that the cooling wind entering along the slant face 6c effectively hits on the bottom faces 7b2 of the rectifier devices 7b. Specifically, the angle of gradient of the slant face 6c is set so that the rectifier device 7b is disposed at radially outer side (lower side in FIG. 2) than a node of the holder fin 7a and a prolongation line of the slant face 6c expressed in broken line in FIG. 2.

Actions and effects of the first embodiment will be described in the following.

When the rotor 3 rotates by a torque transmitted from the engine, the cooling fans 10, 11 integrally rotating with the rotor 3 generate the cooling wind A, B and C as shown in FIG. 1. The cooling wind A generated by a front cooling fan 10 flows through the air intake windows 5a into an inside space of the front frame 5 and is discharged through the air discharge windows 5b.

While, the cooling wind B generated by a rear cooling fan 11 flows through the aeration windows 8b formed in the protection cover 8 into a inner space of the protection cover 8, then through the air intake windows 6a into a inner space of the rear frame 6, and is discharged through the air discharge windows 6b of the rear frame 6.

The cooling wind C generated by the rear cooling fan 11 flows through the openings 8a into a inner space of the protection cover 8, then through the air intake windows 6a into a inner space of the rear frame 6, and is discharged through the air discharge windows 6b of the rear frame 6.

The cooling fans 10, 11 functions as centrifugal fans at least. The rear cooling fan 11 has blades larger than those of the front cooling fan 10. Each of the cooling fans 10, 11 has a circular base portion fixed on an axial end face of the pole core 3b and a plurality of blades provided to be upright on this base portion. The plurality of blades is arranged in a circular row and forms an air intake space at radially inner side thereof. The cooling fans 10, 11 take in the outer air along the axial direction thereof from both end sides of the AC generator 1 and discharge the air to radially outer side of the AC generator 1.

The rear cooling fan 11 takes in the outer air through a plurality of air intake windows 6a formed in an end face wall of the frame 6. The air intake windows 6a are approximately sector-shaped openings and arranged around a bearing box for supporting the bearing 14 located at a center of the frame 6. Thus, the frame 6 and the protection cover 8 form a passage for flowing the cooling wind therebetween. The protection cover 8 covers at least the air intake windows 6a of the frame 6, and is disposed on an axial end face of the frame 6 and fixed thereto. The outer air is taken in through the plurality of the aeration windows 8b provided on an axial end face of the protection cover 8.

Further, the outer air is taken in also through the openings 8a at a peripheral portion of the dish-shaped wall face of the protection cover 8. The openings 8a open on radially outer wall face of approximately cylinder-shaped AC generator 1.

The openings 8a are disposed between the frame 6 and the outer peripheral portion of the protection cover 8. The openings 8a are slits arranged in a C-shaped range of the protection cover 8 in accordance with C-shaped rectifier 7, or in a whole circular range of the protection cover 8. The outer openings 8a are intermittently disposed in accordance with an arrangement of the rectifier devices 7b.

Approximately plate-shaped rectifier 7 is disposed inside of the protection cover 8. The rectifier 7 has an approximately plate-shaped portion including a holder fin 7a and rectifier devices 7b fixed on the holder fin 7a. The plate-shaped portion of the rectifier 7 extends along an imaginary plane perpendicular to the center axis of the AC generator 1. The plate-shaped portion of the rectifier 7 has an approximately C-shaped form extending along the outer peripheral portion of the protection cover 8. A plurality of the rectifier devices 7b is arranged at an interval in a circumferential direction on the plate-shaped portion of the rectifier 7. The plate-shaped portion of the rectifier 7 is located inside of the diameter of the frame 6.

The protection cover 8 is also located inside of the frame 6. The periphery of the plate-shaped portion of the rectifier 7 is disposed with a slight clearance with the periphery of the protection cover 8, or in contact with the periphery of the protection cover 8. Thus, the plate-shaped portion of the rectifier 7 divides a space inside of the protection cover 8 in the axial direction of the AC generator 1. The rectifier 7 is supported by the frame 6 so as to form a clearance between the plane-shaped portion of the rectifier 7 and the outer face of the frame 6.

The clearance between the frame 6 and the plate-shaped portion of the rectifier 7 communicates with the openings 8a and with the air intake windows 6a. The clearance between the frame 6 and the plate-shaped portion of the rectifier 7 and the openings 8a form an airflow passage extending along the radial direction of the AC generator 1. The airflow passage is slightly inclined to the radial direction in such a manner of gradually shifting in the axial direction from inner side to outer side of the AC generator 1 as going from a periphery to a center in the radial direction.

The airflow passage is oriented to axially outer side at the radially outer position thereof. The airflow passage opens in such a manner of taking in airflow linearly along the radial direction from radially outside, and extends in the radial direction. The wall face of the frame 6 forming this airflow passage also forms a slant face 6c inclined so as to coming to the plate-shaped portion of the rectifier 7 gradually from radially outer side to radially inner side. The slant face 6c and the plate-shaped portion of the rectifier 7 form an airflow passage therebetween whose width in the axial direction gradually decreases from radially outer side to radially inner side.

A part of the rectifier device 7b is disposed at radially inner portion of the plate-shaped portion of the rectifier 7. The rectifier devices 7b expose their bottom faces 7b2 as a part of a surface of the plate-shaped portion. The rectifier devices 7b is arranged in such a manner that its bottom faces 7b2 face the wall face of the frame 6. The slant face 6c is inclined so as to form an airflow oriented to the rectifier device 7b located on the plate-shaped portion of the rectifier 7. The slant face 6c is inclined so that the airflow is oriented to the bottom face of the rectifier device 7b disposed and located on the plate-shaped portion of the rectifier 7. The slant face 6c can be formed so that the speed of the airflow becomes its maximum at the bottom face 7b2 of the rectifier device 7b.

As indicated by an arrow in FIG. 2, the slant face 6c on the rear frame 6 induces the cooling wind C flowing through the openings 8a of the protection cover 8 toward the rectifier devices 7b, so as to hit on the bottom faces 7b2 of the rectifier devices 7b and to cool the rectifier devices 7b effectively. Especially in the first embodiment, the rectifier devices 7b is disposed at radially outer side than a node of a prolongation line of the slant face 6c and the holder fin 7a. Thus, the rectifier devices 7b can be cooled by directly hitting the cooling wind C induced by the slant face 6c on the bottom faces 7b2 of the rectifier devices 7b, so as to derive an effect in cooling the rectifier devices 7b effectively without improving the performance of the cooling fans.

Further, the distance 17 between the rear frame 6 and the holder fin 7a may not set narrow to hit the cooling wind C effectively on the bottom face 7b2 of the rectifier devices 7b, because the performance in cooling the rectifier devices 7b is improved by an action of the slant face 6c on the rear frame 6. Thus, the muddy water intruded in the distance 17 can be discharged well. Accordingly, the slant face 7c is inclined in such a manner that the distance 17 between the slant face 7c and the holder fin 7a gradually increases from the start end 6c1 to the terminal end 6c2, so that muddy water scarcely stay therein and a corrosion of a holder fin 7a (especially at a portion where the rectifier devices 7b is press-fitted therein) by salt water can be restricted.

Second Embodiment

Figure 3:
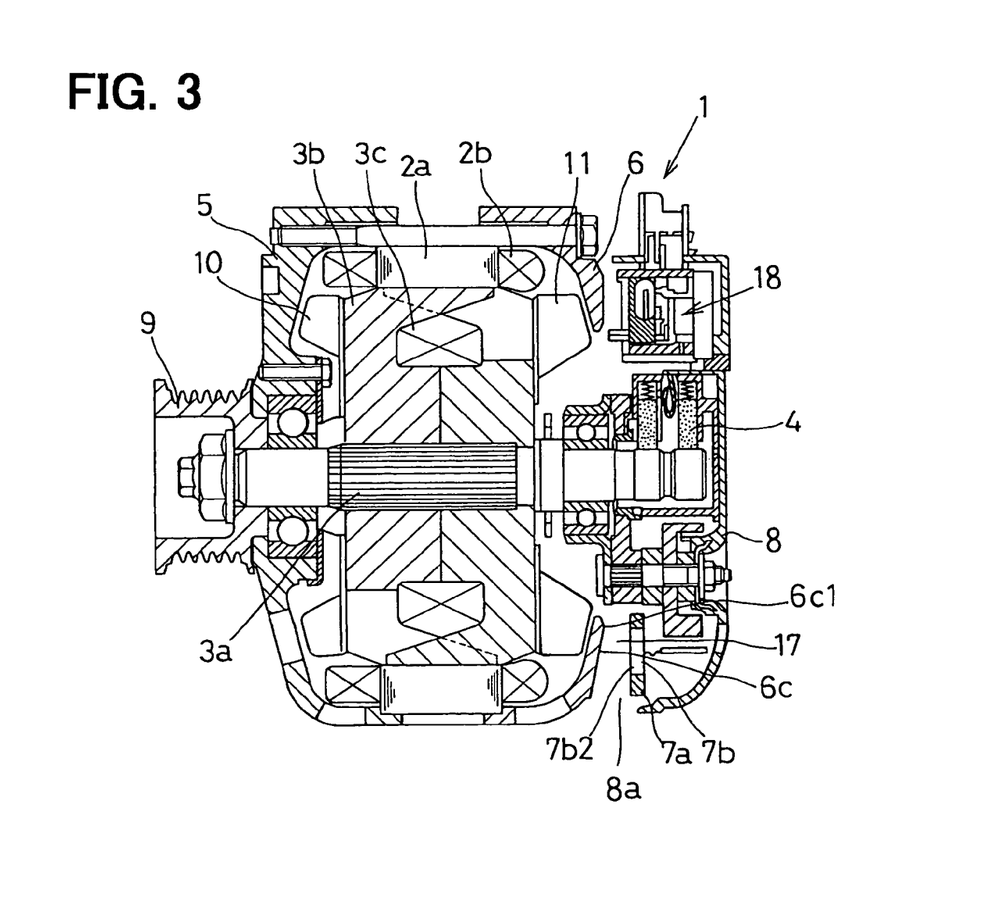
FIG. 3 is a cross-sectional view of an AC generator for a vehicle according to a second embodiment.

As shown in FIG. 3, an AC generator 1 according to a second embodiment is an example having a slant face 6c of which a start end 6c1 is radially inner side (upper side in FIG. 3) than the rectifier devices 7b.

According to this structure, a distance 17 between the slant face 6c and the rectifier devices 7b can be wide, so as not to stay muddy water and so on therein and to restrict corrosion of a holder fin 7a (especially at a portion where the rectifier devices 7b is press-fitted therein) by salt water and so on. Further, the slant face 6c induces the cooling wind to hit on a bottom faces 7b2 of the rectifier devices 7b effectively, so as to improve a performance in cooling the rectifier devices 7b.

Third Embodiment

Figure 4:
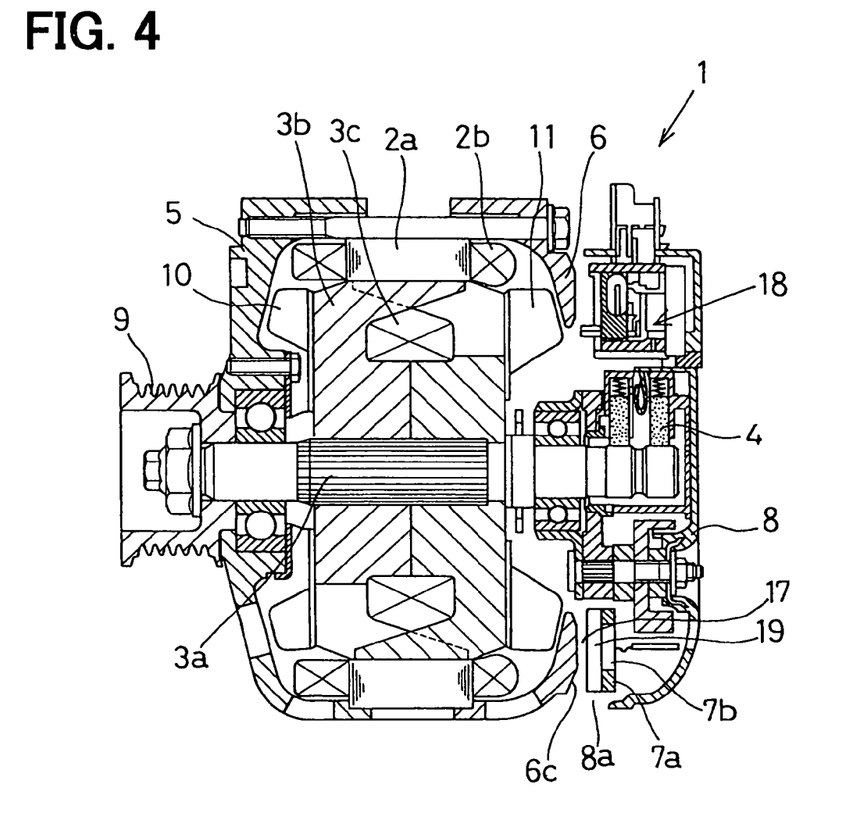
FIG. 4 is a cross-sectional view of an AC generator for a vehicle according to a third embodiment.

As shown in FIG. 4, an AC generator 1 according to a third embodiment has heat radiation ribs 19 on the holder fin 7a at negative electric potential.

Figure 5:
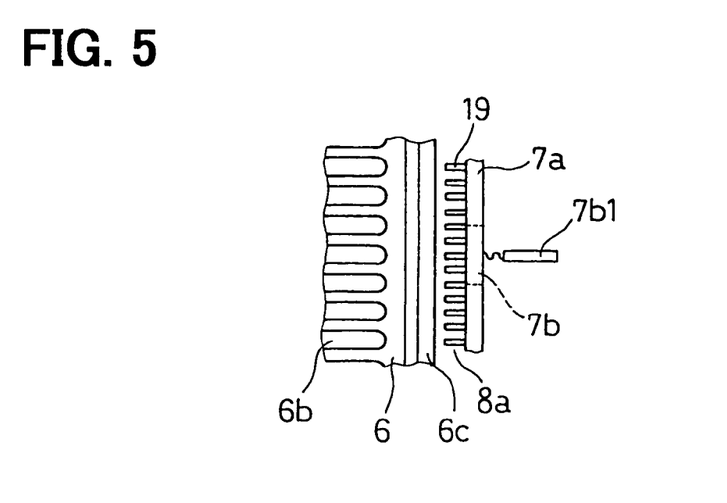
FIG. 5 is a side view of heat radiation ribs according to the third embodiment.

As shown in FIG. 5, a number of the heat radiation ribs 19 are disposed on a face of the holder fin 7a at a side of the rear frame 6, so as to be in a radial direction of the holder fin 7a along the flowing direction of the cooling wind.

According to this structure, the heat radiation ribs 19 on the holder fin 7a increase the area for heat radiation of the holder fin 7a, so as to improve a heat radiation performance thereof. Further, the heat radiation ribs 19 forms discharge passages therebetween for discharging muddy water that intruded thereinto, so as to improve a performance more in discharging the muddy water, etc.

Further, the slant face 6c on the rear frame 6 induces the cooling wind C to hit on the bottom faces 7b2 of the rectifier devices 7b and to cool the rectifier devices 7b effectively, as same as those in the first and the second embodiments.

Figure 6:
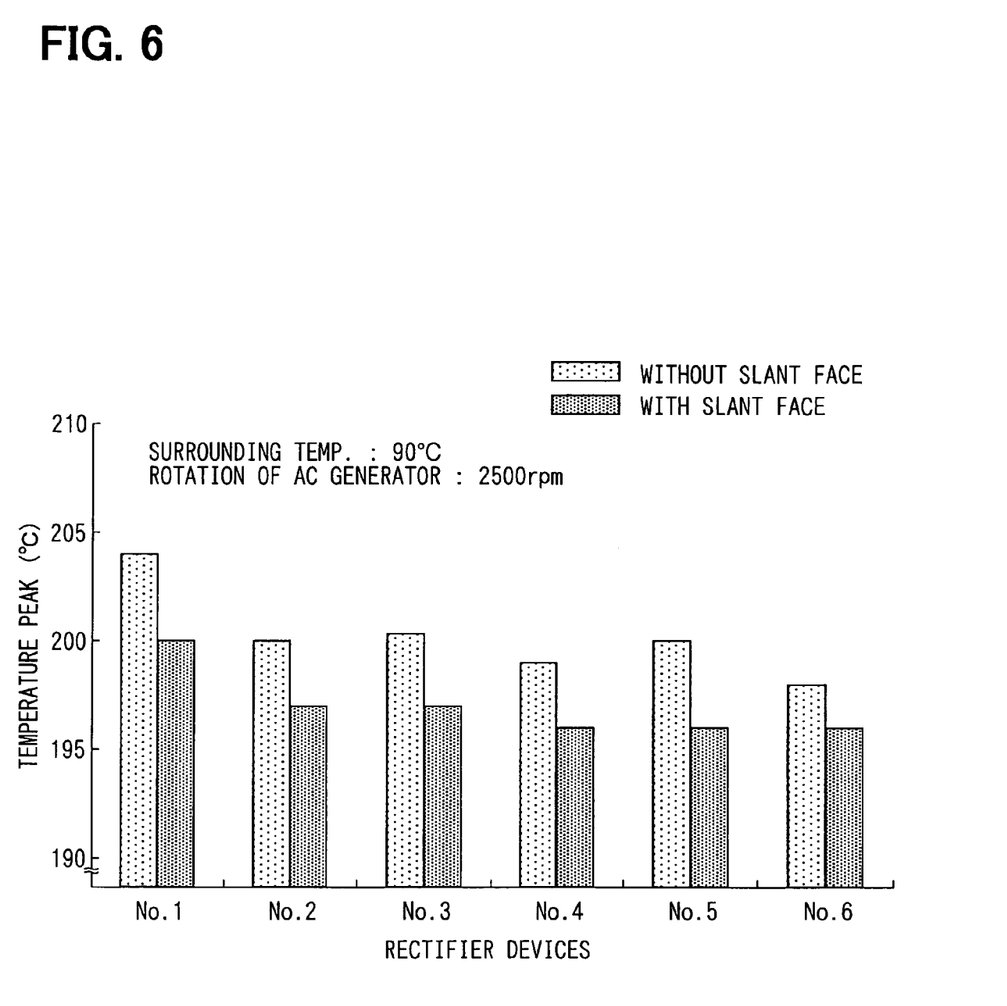
FIG. 6 is a graph showing an effect of the AC generator according to the third embodiment.

FIG. 6 depicts the effect by the slant face 6c, according to an experiment to compare the cooling ability of an AC generator with the slant face 6c and that without the slant face 6c, at a surrounding temperature of 90° C. and in rotating the rotor 3 at 2500 rpm. Each of the AC generators 1 has six rectifier devices 7b. According to the experiment, the slant face 6c can decrease the temperature of the rectifier devices 7b by 2° C. to 4° C. more.

Fourth Embodiment

Figure 7:
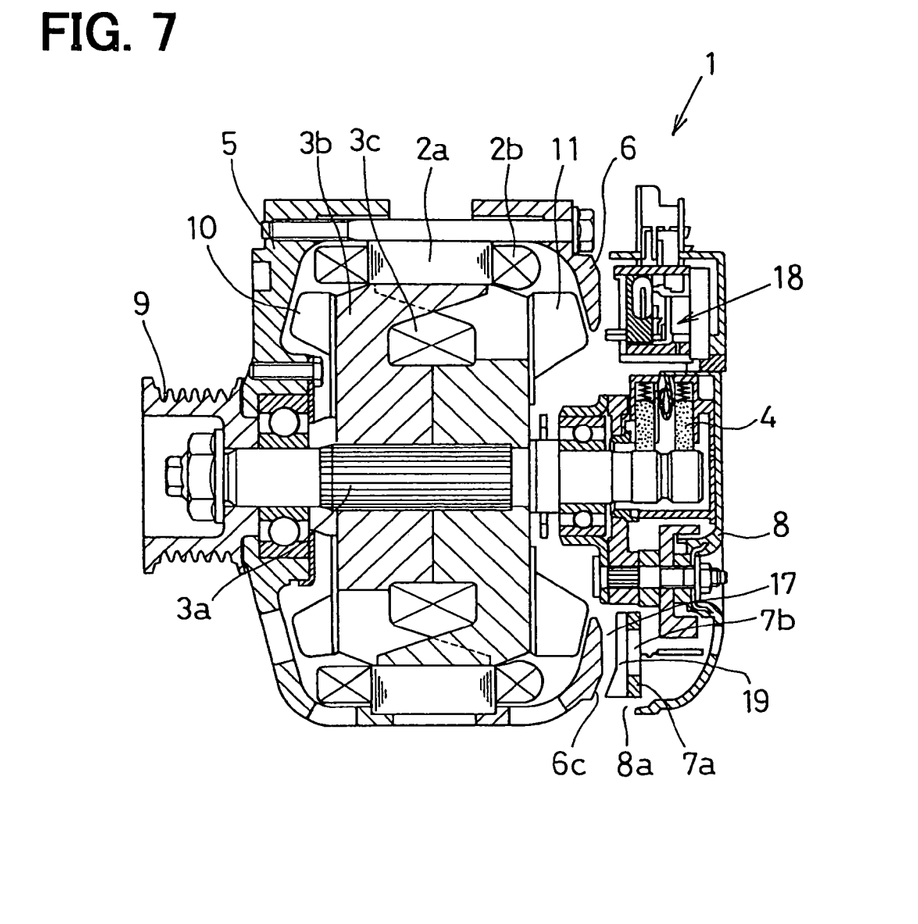
FIG. 7 is a sectional-view of an AC generator for a vehicle according to a fourth embodiment.

As shown in FIG. 7, an AC generator 1 according to a fourth embodiment has heat radiation ribs 19 on the holder fin 7a at negative electric potential similarly to the third embodiment, and the heat radiation ribs 19 of which heights vary in such a manner of being along the slant face 6c of the rear frame 6. That is, as shown in FIG. 7, the heights of the heat radiation ribs 19 gradually increase from s radially inner side to s radially outer side so that clearances between the heat radiation ribs 19 are approximately constant.

Figure 8:
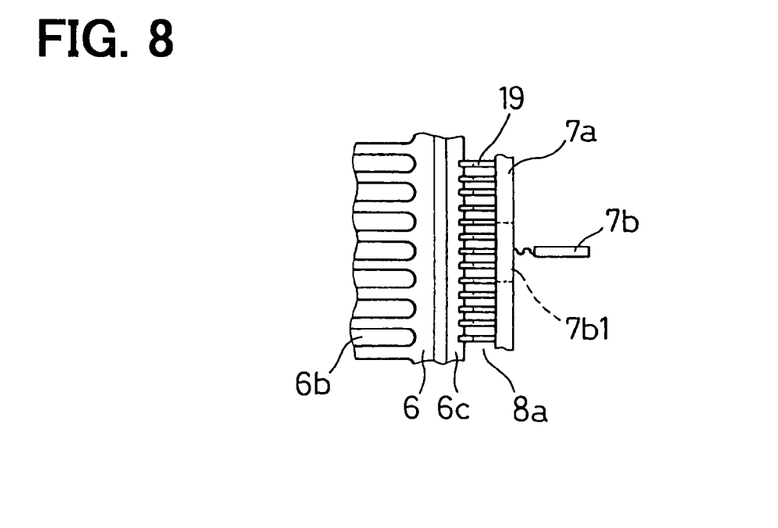
FIG. 8 is a side view of heat radiation ribs according to the fourth embodiment.

According to this structure, the heat radiation ribs 19 on the holder fin 7a further increase the area for heat radiation of the holder fin 7a, so as to improve a heat radiation performance more. Further, as shown in FIG. 8, the heat radiation ribs 19 are disposed at the openings 8a of the protection cover 8, so as to have an effect of restricting the intrusion of muddy water, etc. through the openings 8a into an internal space of the protection cover 8.

Fifth Embodiment

Figure 9:
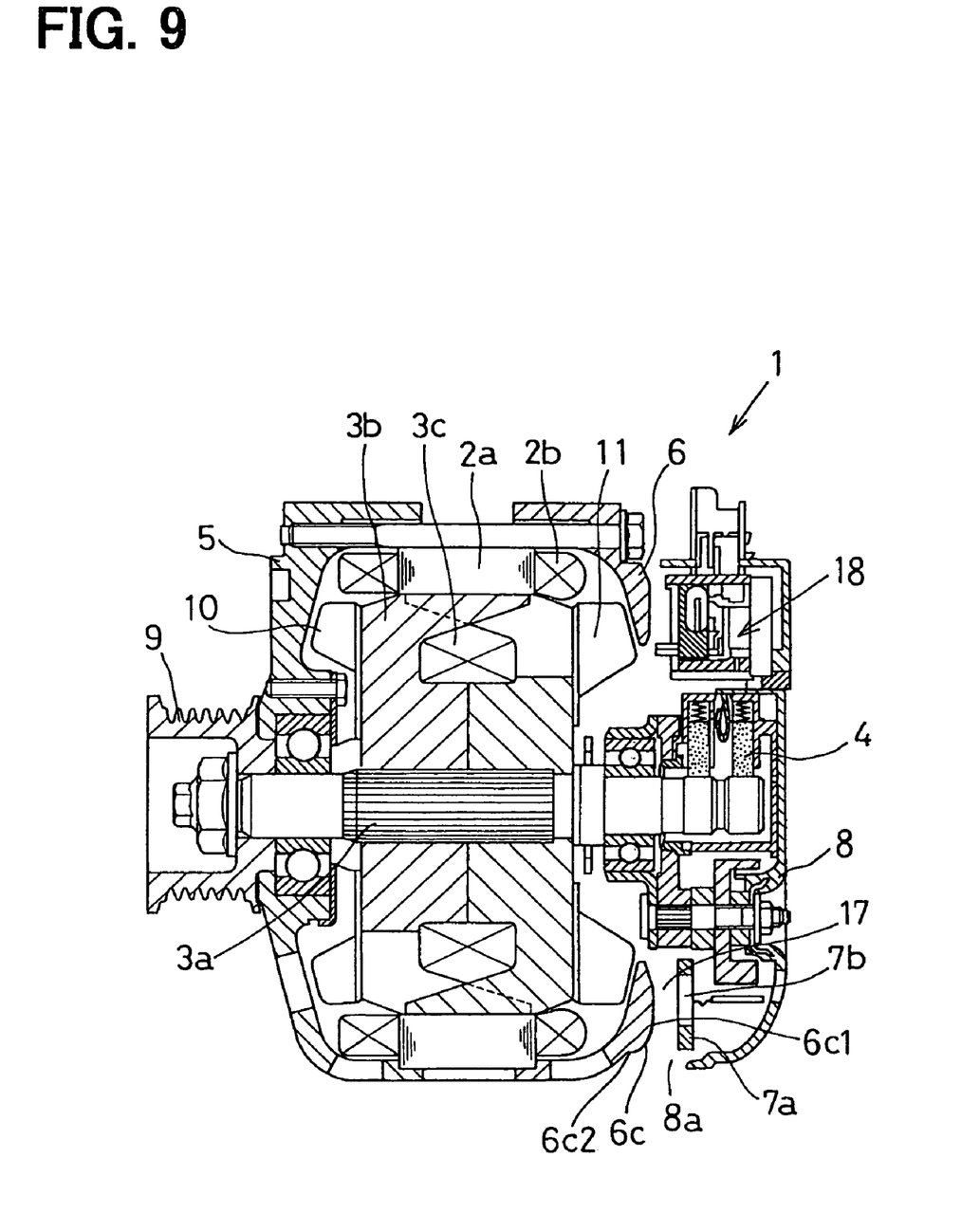
FIG. 9 is a cross-sectional view of an AC generator for a vehicle according to a fifth embodiment.

As shown in FIG. 9, an AC generator 1 according to a fifth embodiment has a convex slant face 6c.

The slant face 6c in the first embodiment is flat, while, the slant face 6c in the fifth embodiment has a convex surface shaped in such a manner that the distance 17 between the slant face 6c and the holder fin 7a gradually increases as shown in FIG. 9. This structure also has an effect substantially as same as that of the first embodiment, that is, to improve a performance in cooling the rectifier device 7b by inducing the cooling wind to the rectifier device 7b by the slant face 6c.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. An AC generator for a vehicle comprising:
   a rotor which is rotated by a torque transmitted thereto;
   a frame rotatably supporting the rotor;
   a cooling fan fixed to the rotor and for taking in a cooling wind from outside by rotating integrally with the rotor;
   a protection cover disposed outside of the frame so that the frame and the protection cover form a gap therebetween for taking in the cooling wind; and
   a rectifier disposed between the frame and the protection cover and having a first end face facing the frame and a second end face opposite to the frame, wherein:
   an axial extent of the frame, which is measured in an axial direction of the rotor, is not overlapped with an axial extent of an outer peripheral wall of the protection cover, which is measured in the axial direction of the rotor;
   the frame has a slant face facing the rectifier;
   a clearance between the slant face and the first end face of the rectifier increases toward outer side in a radial direction of the frame, and
   a plurality of heat radiation ribs disposed on the first end face of the rectifier, each of the heat radiation ribs extending in an airflow direction of the cooling wind, wherein a height of each of the heat radiation ribs gradually increases toward outer side in the radial direction so that a ridge of each of the heat radiation ribs extends along the slant face.

2. An AC generator for a vehicle comprising:
   a rotor which is rotated by a torque transmitted thereto;
   a frame rotatably supporting the rotor;
   a cooling fan fixed to the rotor and for taking in a cooling wind from outside by rotating integrally with the rotor;
   a protection cover disposed outside of the frame so that the frame and the protection cover form a gap therebetween for taking in the cooling wind; and
   a rectifier disposed between the frame and the protection cover and having a first end face facing the frame and a second end face opposite to the frame, wherein:
   the frame has a slant face facing the rectifier;
   every imaginary line, which is in parallel with the slant face and intersects the rectifier, does not intersect an outer peripheral wall of the protection cover; and
   a clearance between the slant face and the first end face of the rectifier increases toward outer side in a radial direction of the frame.

* * * * *